March 10, 1970   O. L. LOOKER   3,499,272
CORN HARVESTING MACHINE
Filed Oct. 16, 1967   9 Sheets-Sheet 1
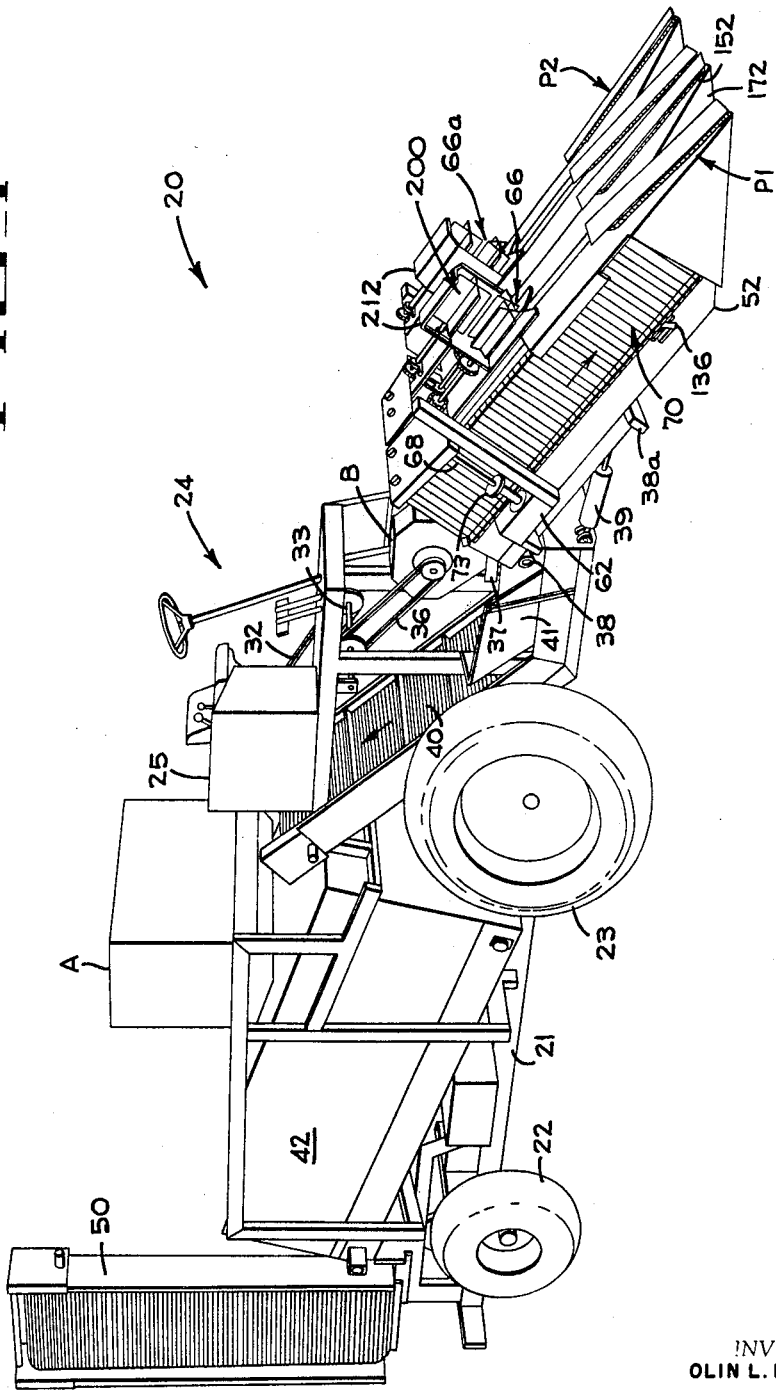
FIG_1
INVENTOR.
OLIN L. LOOKER
BY J W Anderson
C. E. Tripp
ATTORNEYS

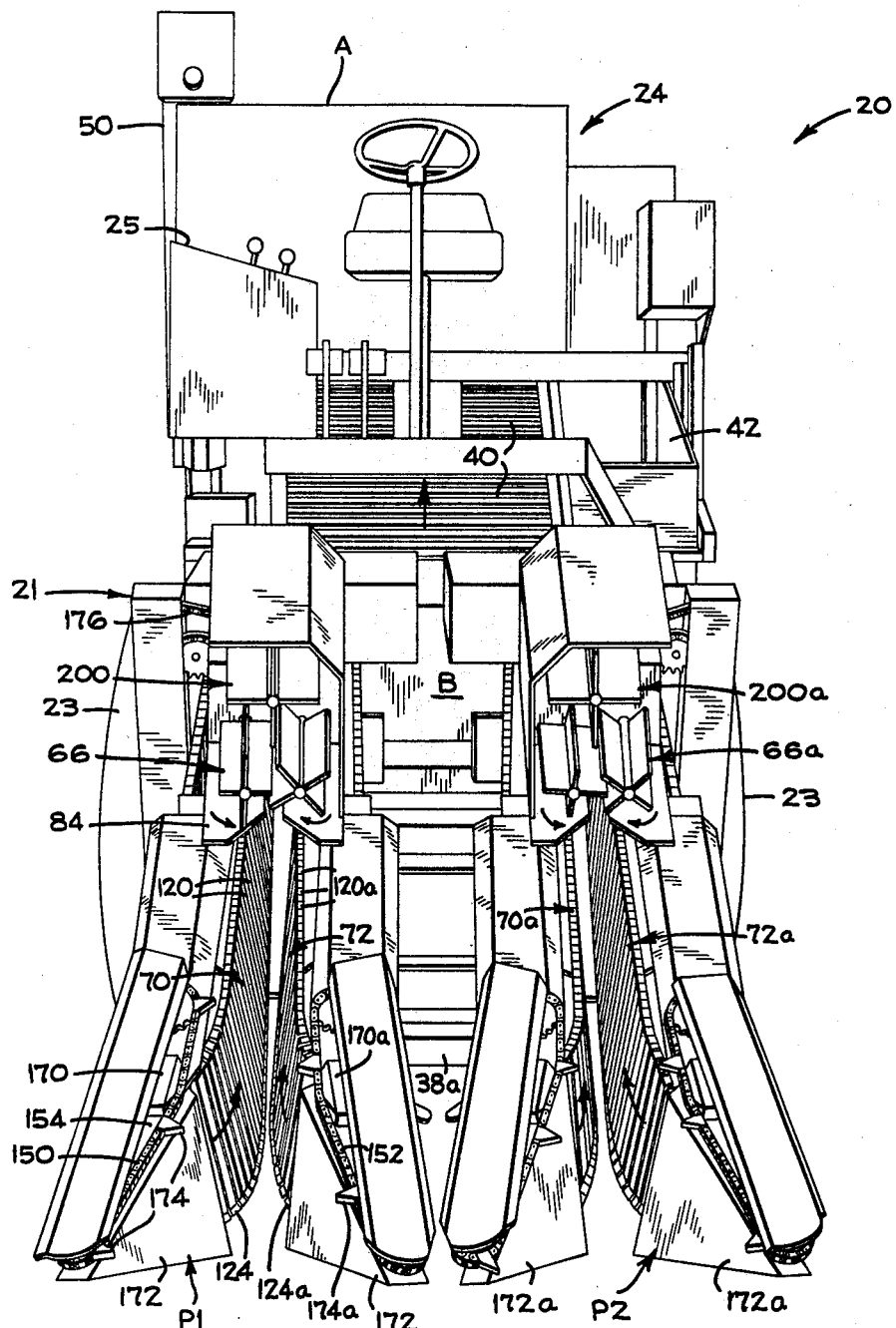

March 10, 1970 — O. L. LOOKER — 3,499,272
CORN HARVESTING MACHINE
Filed Oct. 16, 1967 — 9 Sheets-Sheet 3
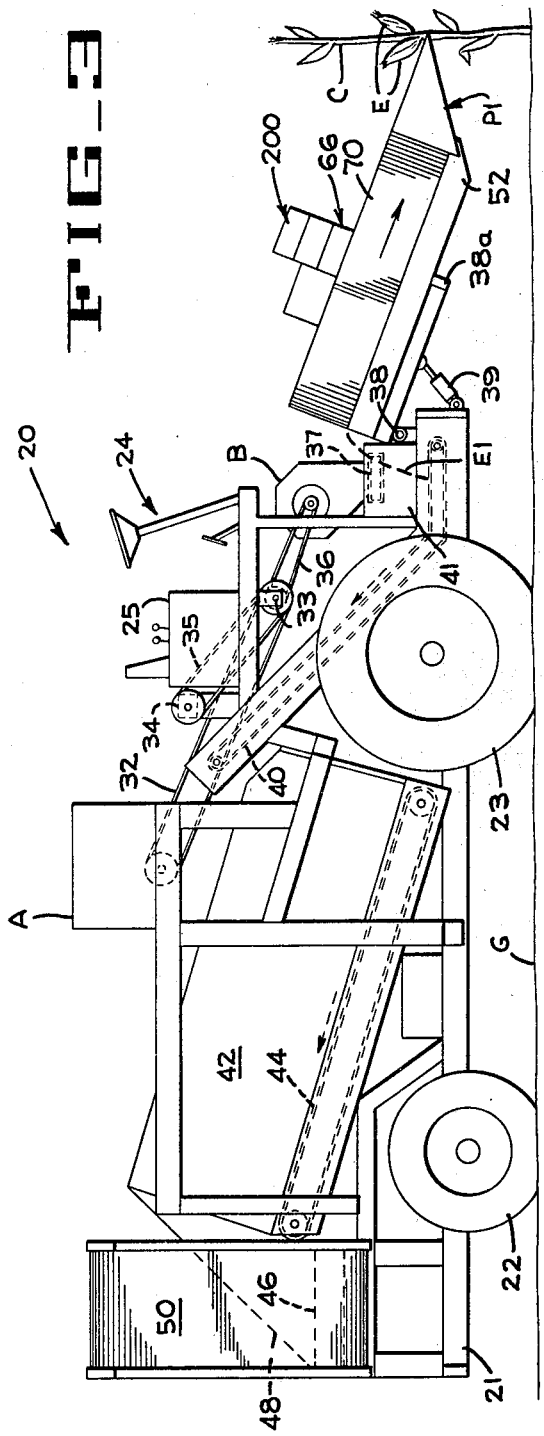
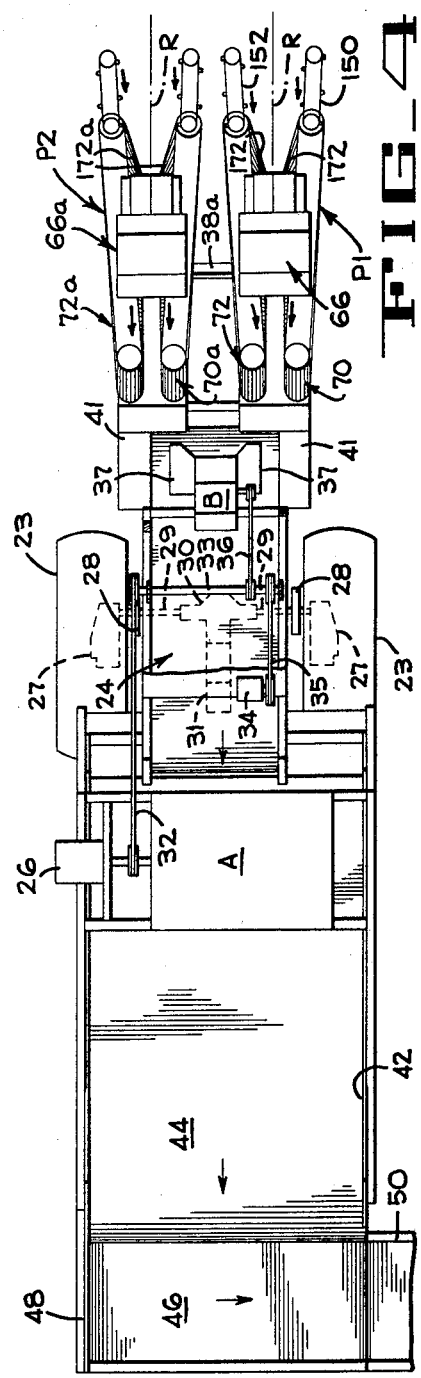
INVENTOR.
OLIN L. LOOKER
BY F. W. Anderson
C. E. Tripp
ATTORNEYS

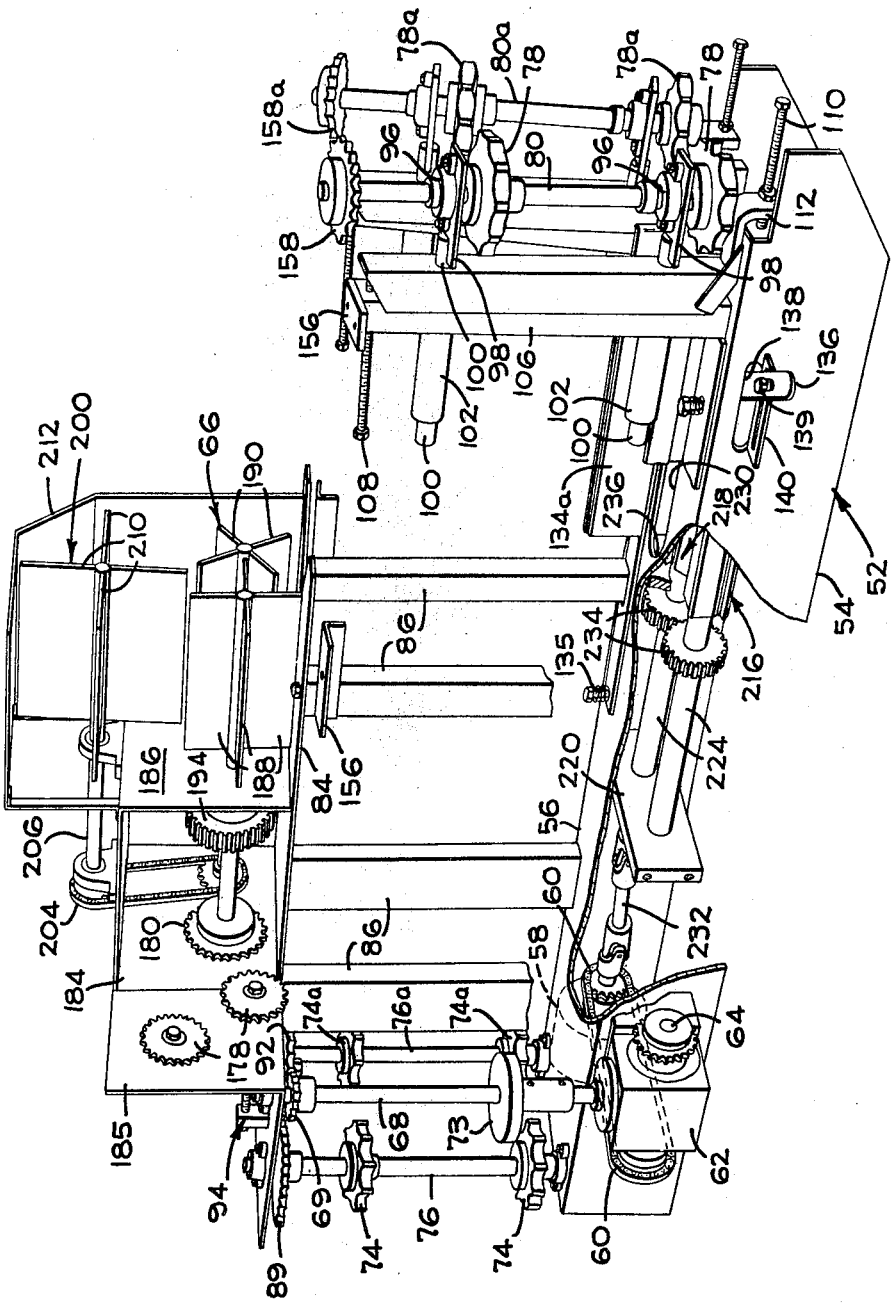

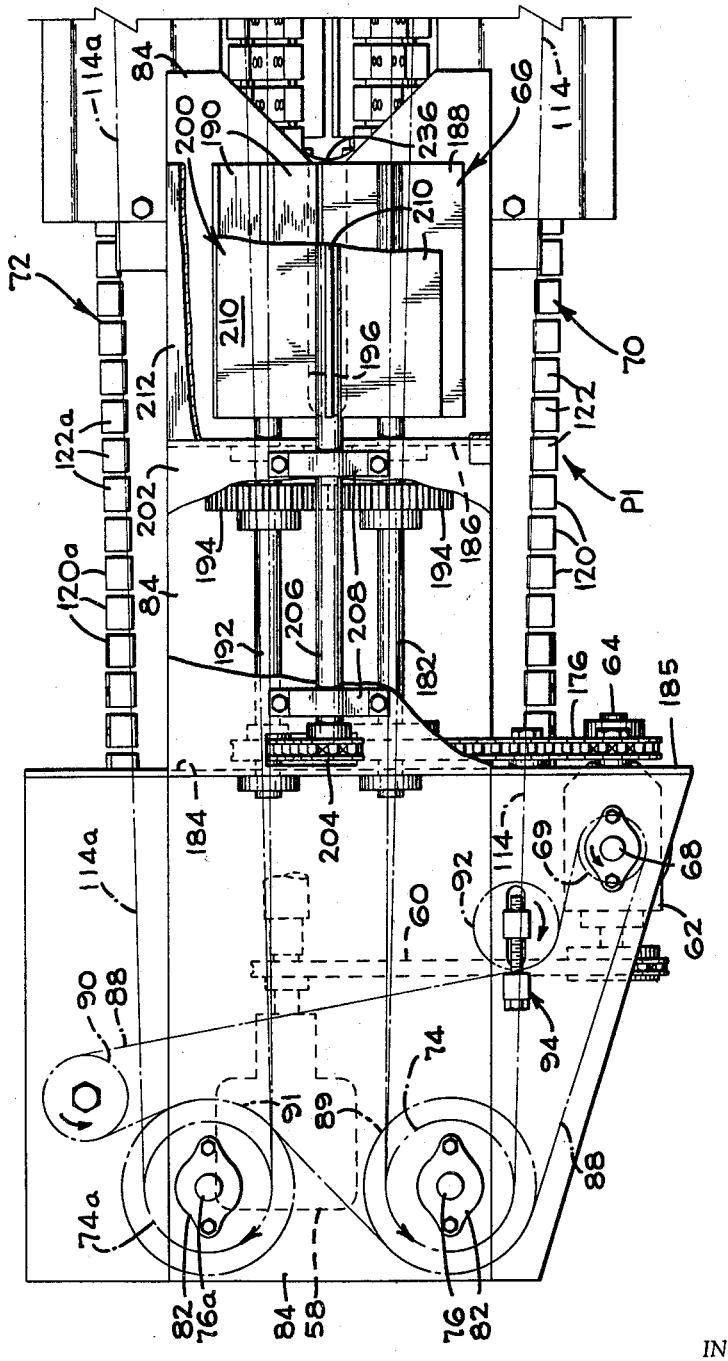

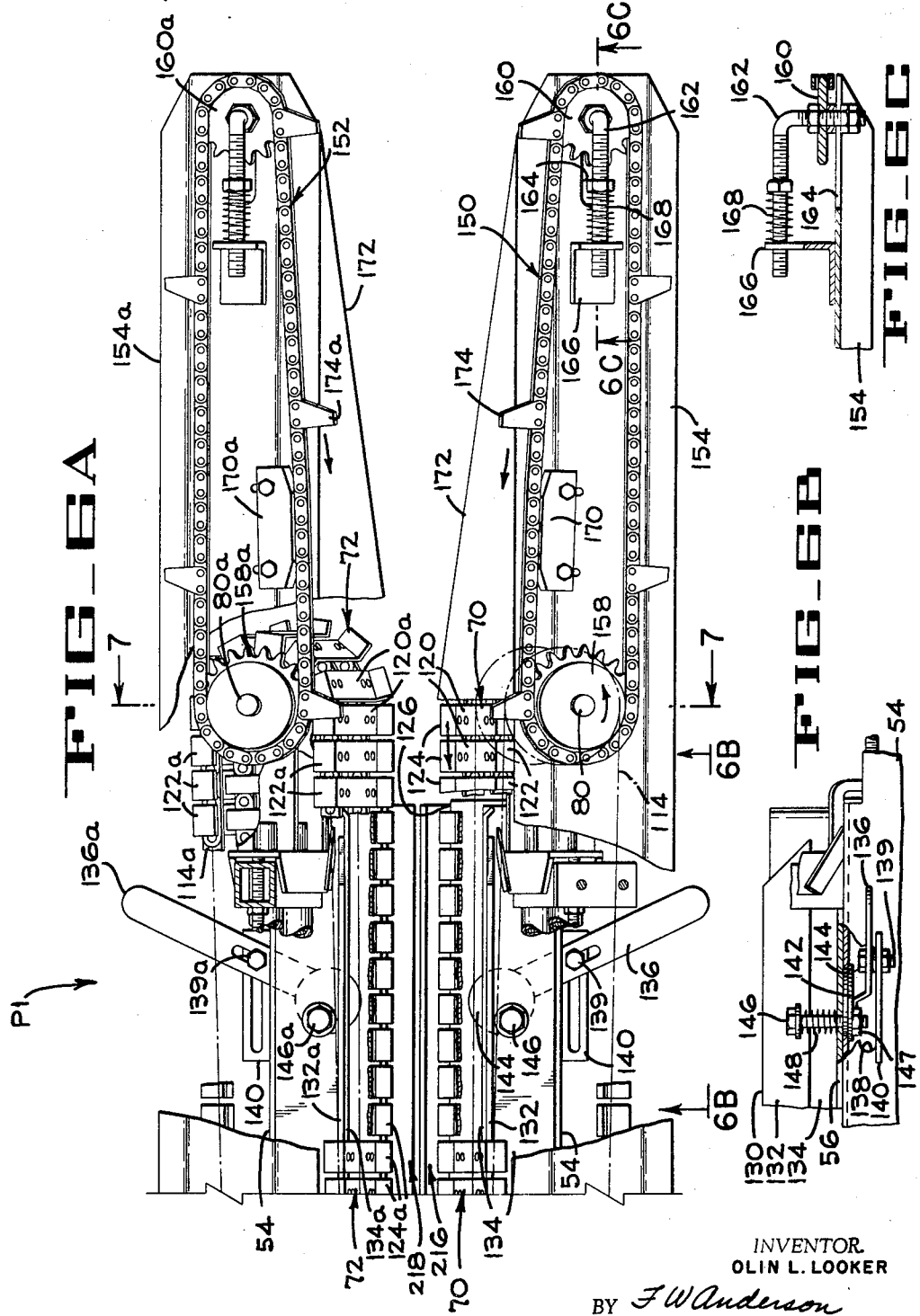

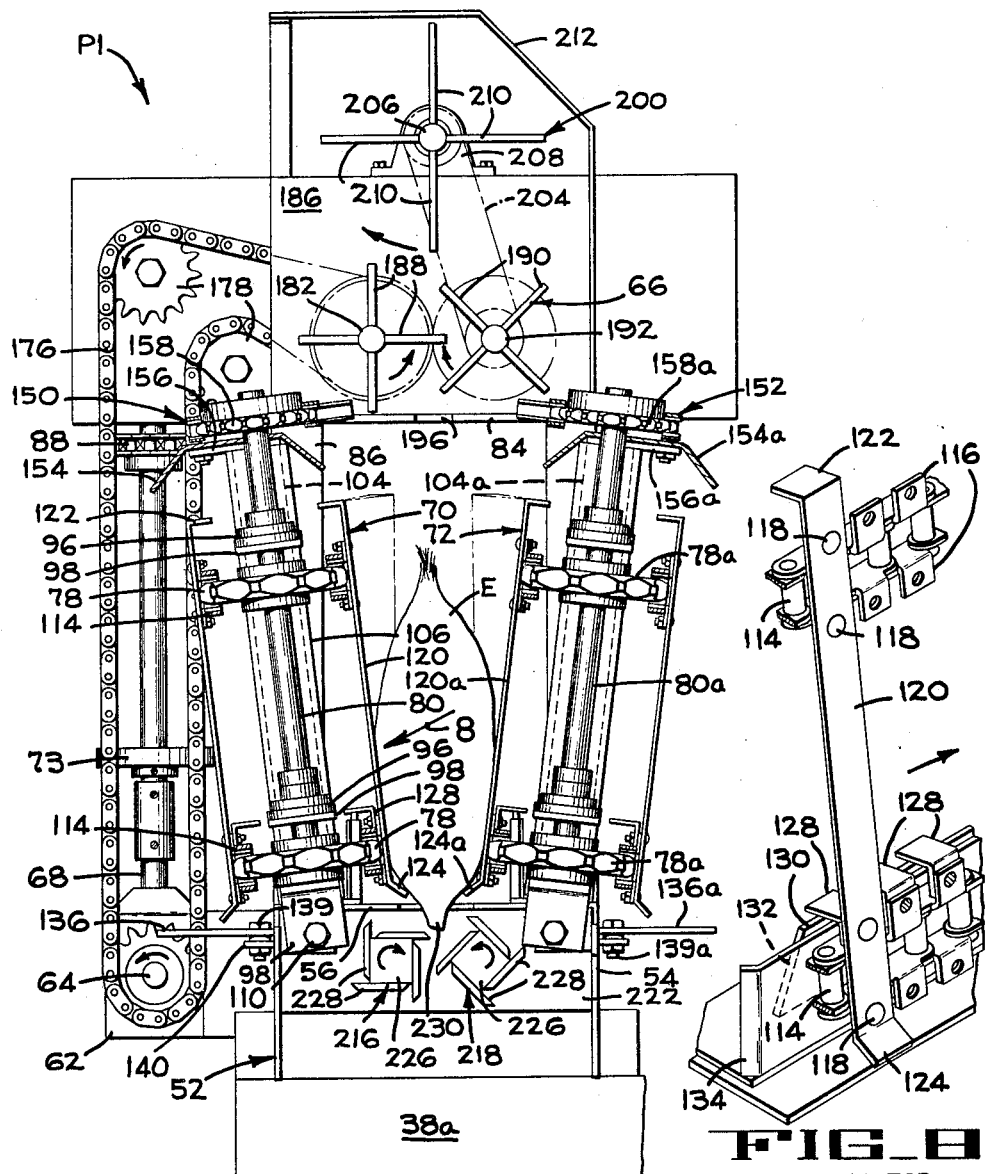

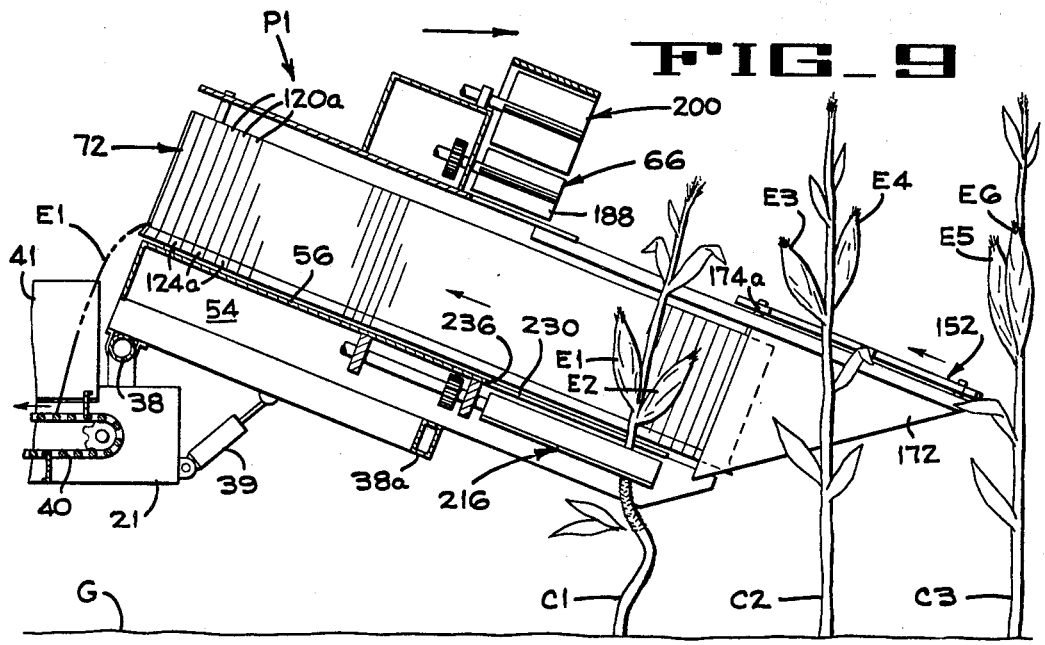
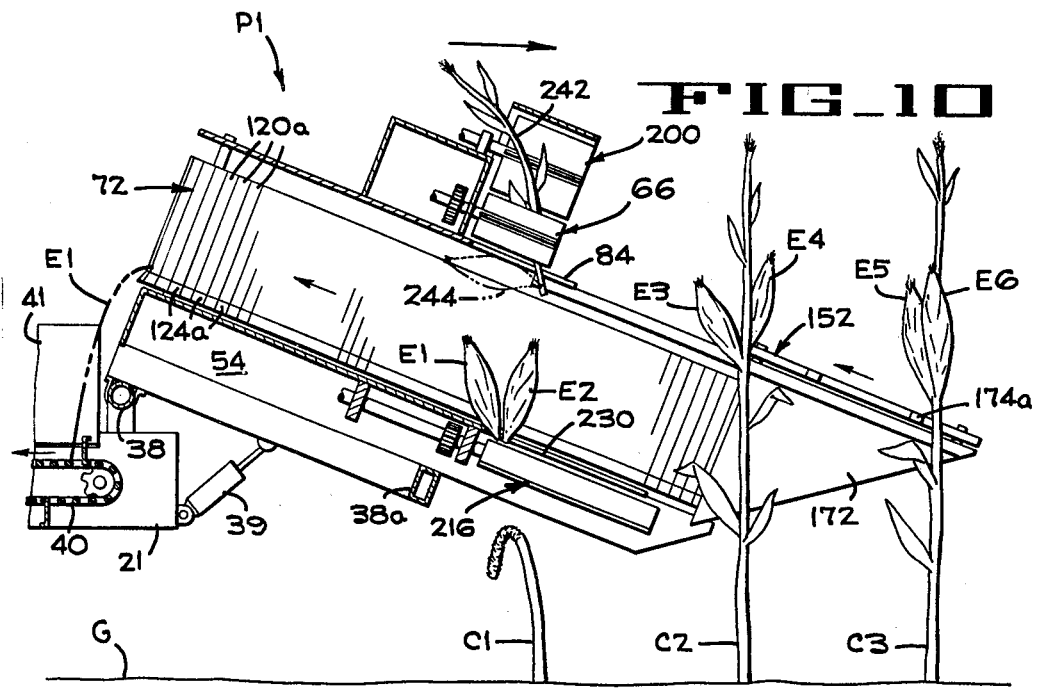

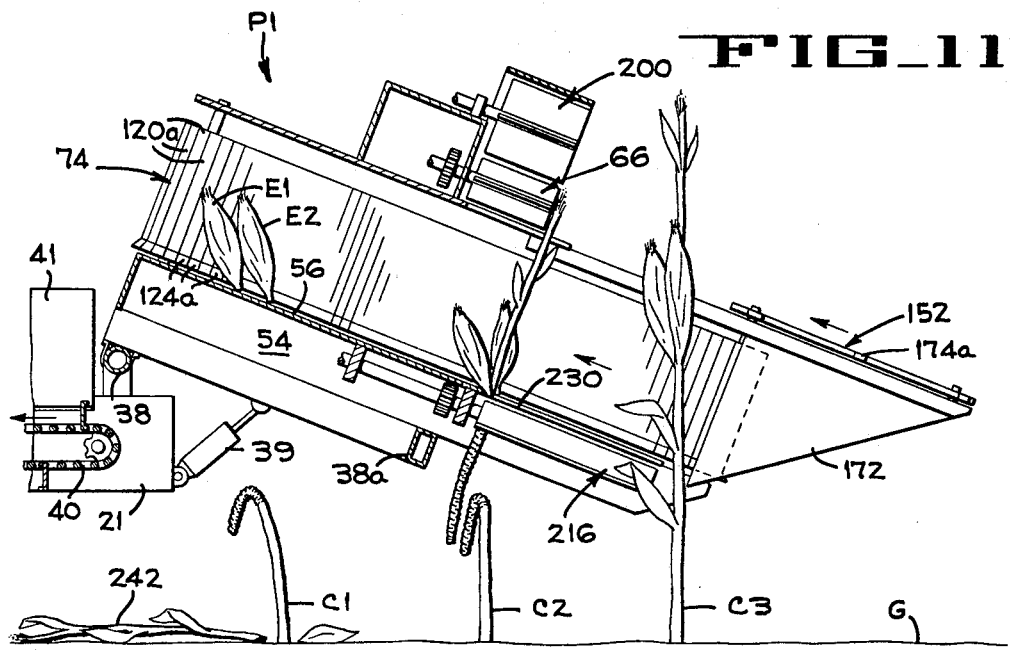
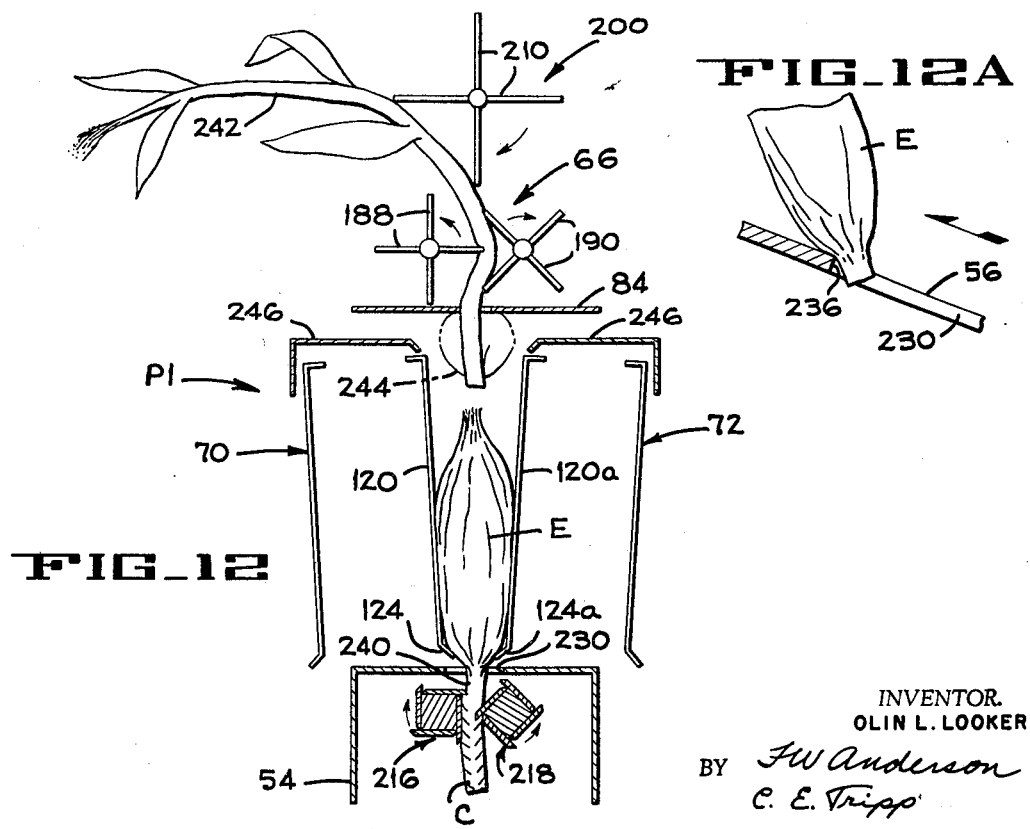

United States Patent Office 3,499,272
Patented Mar. 10, 1970

3,499,272
CORN HARVESTING MACHINE
Olin L. Looker, Milford, Ill., assignor to FMC Corporation, San Jose, Calif., a corporation of Delaware
Filed Oct. 16, 1967, Ser. No. 675,467
Int. Cl. A01d 45/02
U.S. Cl. 56—18         13 Claims

ABSTRACT OF THE DISCLOSURE

A moving stop bar assembly is formed of a pair of simultaneously driven endless gathering belts having confronting flights of closely spaced stop bars which straddle the cornstalks. The stop bars are so formed that the confronting flights cooperatively form an upright moving wall, at each side of the cornstalks, with a diagonal lower edge portion which declines toward the stalk to form, in conjunction with the other edge portion, a ledge or butt stop for arresting downward movement of the ears to be thereby stripped from the stalk, an elongate slot to provide clearance for the stalk, and an ejection path for loose husks, leaves and other waste material.

CROSS REFERENCES TO RELATED APPLICATIONS

The present disclosure includes a broken-stalk ejecting mechanism which is the subject matter of the pending patent application of Sears, Ser. No. 660,357, assigned to the same assignee as the present invention.

BACKGROUND OF THE INVENTION

Field of the invention

The present invention is directed to mobile harvesting machines, and more particularly to corn harvesting machines having stalk guide and conveying means such as a gathering belt or chain run at each side of the row of cornstalks, a slotted plate or similar stop to arrest the ears between the lower portions of the confronting flights of the gathering belt, and snapping rolls or knife blade rotors beneath the stripper plate for pulling the cornstalks downward through the slotted stripper plate. The stripper plate arrests the ears on the cornstalk so that the stalks are either pulled from the ears by the snapping rolls, or the stems of the ears are severed by the knife blade rotors.

Description of the prior art

A prior art harvesting machine of the general type mentioned above is shown, for example, in the patent of Schaaf et al., 2,716,321. The harvesting mechanism in Aaslund 2,480,209 provides gathering chains having adjacent runs with interdigitating fingers which both guide the stalk and form a stop to arrest the ears as the stalk is pulled down by a pair of subposed snapping rolls. This construction eliminates the usual fixed, slotted stripper plate that is subject to frequent clogging by leaves, husks and other waste foliage, and conveys the waste from the ear stripping zone. The interdigitating fingers carry loose waste rearward with the harvested ears unless the waste is positively pulled downward by the snapping rolls. There is also the probability that the tassle-end of some ears will drop into the snapping rolls when the ears are lying on the fingers, thus stripping some of the husk from the ear and perhaps exposing the kernels.

SUMMARY OF THE INVENTION

Broadly stated, one problem which is common to prior corn harvesting machines is that of removing leaves, husks, broken stalks and all other debris which is normally taken into the inlet end of the machine. It is desirable that the waste material is immediately diverted or ejected from the path of the harvested ears of corn, because it may otherwise physically damage the harvested ears, structurally damage the machine, or at the very least adversely affect the output of the machine by making frequent shutdowns and cleaning necessary.

For the above reasons, many prior art corn harvesting machines employ special stalk handling techniques and separating mechanisms with the objective of effecting an early separation of the ears from all other materials gathered in the harvesting operation.

The harvester of the present invention is a high output (from 8 to 10 tons per hour) self-propelled corn harvesting machine which includes improved picking heads for separating the stalks and ears. The picking heads minimize relative motion between the ears and fixed mechanism, and retain the stalks and ears under positive control during the severing of the ears. The picking heads further provide for the immediate removal of most of the waste foliage and broken stalks at the time the stalks and ears are separated. These results are achieved by means including a moving stop bar assembly comprising confronting belt reaches formed of flights or stop bars having vertical portions which cooperate to form a moving ear conveying wall and lower ends which extend inward to cooperatively form a moving shelf or butt stop which will arrest the ears. The lower edges of the butt stop in one reach are spaced from the adjacent edges of the other reach from front to rear to define a straight, vertically open slot to clear the stalks and allow debris to fall through. The stop bars lightly grip the ears so that they maintain generally upright positions and are always fed butt-end first to the knife blade rotors which sever the attachment of the ear to the stalk. This upright position precludes any portion of the husk from being stripped off the ear and exposing the kernels to damage. Following the stalk and ear separation, the butt ends of the moving ears are temporarily arrested so that their tassle-ends advance relative to the butt ends. As a result, every ear which is harvested is oriented for subsequent movement tassle-end first.

BRIEF DESCRIPTION OF THE DRAWINGS

FIGURE 1 is a perspective of the corn harvesting machine with its leading end picking heads and a trailing end discharge conveyor in non-operative parking or rest positions.

FIGURE 2 is a frontal perspective of the harvesting machine shown in FIGURE 1.

FIGURE 3 is a diagrammatic side elevation of the overall harvesting machine, similar to FIGURE 1, but in an operative, harvesting condition.

FIGURE 4 is a diagrammatic plan of the harvesting machine in the position shown in FIGURE 3.

FIGURE 5 is an enlarged perspective of the frame of one of the two picking heads on the leading end of the machine.

FIGURES 6 and 6A conjointly illustrate one picking head, in plan, and are each partly broken away to show mechanism which would otherwise be concealed.

FIGURE 6B is a fragmentary elevation, partly broken away, of the area indicated by arrows 6B—6B on FIGURE 6A.

FIGURE 6C is a fragmentary section taken along lines 6C—6C on FIGURE 6A.

FIGURE 7 is a section taken along lines 7—7 on FIGURE 6A.

FIGURE 8 is an enlarged fragmentary perspective of an endless belt flight indicated by the general arrow 8 on FIGURE 7.

FIGURES 9–11 show diagrammatic operational sequences of the harvesting action of one of the picking heads.

FIGURE 12 is a section, similar to FIGURE 7, diagrammatically illustrating the manner in which the picking heads harvest the ears and discard substantially all waste materials.

FIGURE 12A is a schematic illustration of the ear orienting operation by means of which all harvested ears are discharged from the picking heads tassle-end first.

DESCRIPTION OF THE PREFERRED EMBODIMENT

The harvesting machine 20 (FIG. 1) includes a frame 21 supported by steerable rear wheels 22 and driven by powered front wheels 23. A driver at a control station 24 manipulates hydraulic controls at a console 25 which govern various power mechanisms, later mentioned, that derive hydraulic power from a main pump 26 (FIG. 4) driven by an engine A.

As shown diagrammatically in FIGURES 3 and 4, the wheels 23 each have a gear reduction hub 27 which is coupled, through a brake 28, by an axle 29 to a differential unit 30. A hydraulic motor and transmission assembly 31 is mechanically coupled to the differential and hydraulically connected to controls at the console 25. The hydraulic motor which drives the transmission is powered by a V-belt and pulley unit 32 which is connected to the engine A and to a jackshaft 33. Extending across the harvesting machine, the jackshaft is coupled to a hydraulic pump 34 by a V-belt and pulley unit 35. The jackshaft also transmits power by a V-belt 36 to a centrifugal blower B that has discharge ducts 37. Air blasts from the ducts 37, as will be later mentioned, blow leaves and other debris lighter than ears onto the ground.

Mounted on the leading end of the harvesting machine 20 (FIG. 1) are laterally spaced picking heads P1 and P2, each head being arranged to straddle a row of cornstalks C that lie along the centerlines R (FIGS. 3 and 4). The picking heads can be pivoted upward, about a common horizontal pivot axis at 38, by energizing a double-acting hydraulic cylinder 39 and an identical cylinder, not shown, at the other side of the machine. The picking heads are interconnected by a tie bar 38a (FIG. 2) so as to move simultaneously about their common pivot axis. The piston rods of the cylinders 39 can be locked in intermediate positions to regulate the height of the free ends of the picking heads from the ground line G when the harvesting machine is in operation. In this regard, it should be noted that the picking heads are shown in a non-operating parking position in FIGURES 1 and 2; for transporting the machine to and from a cornfield, the picking heads are elevated from this position. In a harvesting operation, the picking heads are adjusted to the position shown in FIGURE 3. The subject matter of the present invention is particularly directed to the picking heads P1 and P2, as will be later described in detail.

Continuing with the general description of the harvesting machine 20, the picking heads P1 and P2 function, when the machine is driven along the rows of stalks, to pull the stalks downward onto the ground, while the ears E are severed from the stalks and conveyed rearwardly within the picking head. Each picking head discharges the harvested ears E along a path E1 onto the level inlet end of an elevator conveyor 40. Guide panels 41 at each side of the elevator conveyor guide the ears onto the conveyor. The air blasts from the blower ducts 37 impinge the guide panels 41. Thus, both panels are tilted outward, as shown in FIGURE 1 for the right-hand panel, so that loose foliage and all other material lighter than the ears is blown up and over the panels onto the ground. Extending a short distance rearwardly, and then upwardly under the control station 24, the elevator conveyor 40 discharges the ears along a path E2 into an open-bottom and open end hopper 42.

The bottom of the hopper comprises an endless slat-type conveyor 44 that discharges the ears along a path E3 onto a cross conveyor 46. Conveyor 46 is masked off at the left side of the machine by a wall 48 and delivers the ears to the right side of the machine. Pivotally connected to the machine frame and aligned with the cross conveyor 46 is an elevator conveyor 50, here illustrated in its upright position that is used when the harvesting machine is moved to and from the cornfield. In a harvesting operation, the elevator conveyor 50 is inclined so as to discharge the ears into an attendant truck or wagon moved along with the harvesting machine.

The picking heads P1 and P2, and the conveyors 40, 44, 46 and 50 are each driven by individual hydraulic motors (only the motor for the picking head P1 being later disclosed) which are hydraulically connected to the pump 26.

With more detailed reference to the structure of the picking heads P1 and P2 of the present invention, the two units include similar parts with minor and obvious differences in orientation. For this reason, only the picking head P1 is herein described in detail.

The picking head P1 is provided with a fabricated frame 52 (FIG. 5) which includes an elongate base member 54, of inverted channel shape, having a top wall 56. Mounted under the wall 56 is a hydraulic motor 58 that is coupled by a chain and sprocket drive connection 60 to the input shaft of a gearbox 62. Two output shafts are provided on the gearbox; a horizontal shaft 64 which drives a stalk ejector mechanism 66, and a vertically extended shaft 68 which carries a sprocket 69 for driving a pair of endless gathering belts 70 and 72 (FIG. 2). The gathering belt 70 is mounted on a pair of drive sprockets 74 keyed to a shaft 76, and a pair of idler sprockets 78 keyed to a shaft 80. Similarly numbered parts with the suffix a carry the gathering belt 72. The shaft 68 (FIGS. 1, 5 and 7) carries a disc 73 which contacts the outer reach of the gathering belt 70 to prevent the belt from interfering with adjacent structure.

As best shown in FIGURE 6, the driveshafts 76 and 76a extend upward through bearings 82 that are secured to an elongate stripper plate 84 which extends forwardly beyond the stalk ejector 66 and is supported by posts 86 from the top wall 56 of the base 54. A chain 88 is trained around the drive sprockets 69, 89 and 91, and around idler sprockets 90 and 92, in a manner which rotates the drive sprockets for the gathering belts 70 and 72 in opposite directions. Takeup for the chain 88 is provided by an adjustment bracket 94 which regulates the position of the idler sprocket 92.

Returning to FIGURE 5, the idler shaft 80 is mounted in bearings 96, each bearing being supported by a mounting plate 98 that is welded to a rod 100. Each rod 100 is slidably mounted in a tube 102 that extends through and is welded to a square post 104. As clearly shown in FIGURE 7, the post 104 and a similar post 104a for the shaft 80a diverge from the base member 52, each post being angled about 7 degrees from vertical. Nested over the front of the post 104 is a "floating" channel 106 having apertures aligned with the tubes 102, and arranged to be positioned in preselected nested relation to the post by bolts 108 and 110. Bolt 108 is threaded through the upper end portion of the post 104 and bears against the inner surface of the channel 106.

The lower end portion of the channel 106 carries a forwardly and downwardly extending bracket 112, through which the bolt 110 is threaded. The end of the bolt abuts a fixed surface of the frame. As thus described, the channel 106 can be positioned fore and aft relative to the post 104, and contacts the mounting plates 98 to maintain the shaft 80 at a predetermined distance from the post. This distance is adjusted to supply the correct tension to the gathering belt 70 (FIG. 2). The shaft 80a is provided with a similar belt-tensioning mechanism.

The gathering belt 70 (FIGS. 5–7) includes two endless chains 114 trained around the pairs of sprockets 74 and 78. As best shown in FIGURE 8, each link of the chains is provided with apertured attachment tabs 116, four such tabs being coplanar, aligned and held with rivets 118 to a flight comprising a metal slat or stop bar 120. The upper end portion of each flight is in effect provided with a blunt edge formed by bending the flight to form an inwardly directed flange 122. The lower end portion of each flight is bent to provide an outwardly declining ledge 124. Referring to FIGURES 6A and 7, it will be seen that the stop bar flights 120 are laterally aligned with similar stop bar flights 120a of the adjacent reach of the gathering belt 72.

The result of this construction is that the ledges 124 cooperatively form, with the ledges 124a of the stop bars 120a, a rearwardly moving butt stop or shelf which will arrest ears of corn. Thus, the gap at 126 between the confronting lower edges of the stop bar flights 120 and 120a is less than the diameter of the smallest ear to be harvested. By means next described, the gap can be adjusted before the harvesting machine is placed in operation.

While the operation of the picking head P1 is later described in conjunction with FIGURES 9–12, it should be noted here that the confronting reaches of the gathering belts 70 and 72 are controlled to move rearward at a linear speed approximately ten percent faster than the ground speed of the machine so as to minimize relative horizontal motion between the ears and the gathering belts, and that the gathering belts are spaced apart such that the flights gently grip the ears rearwardly of the upwardly diverging forward end portions of the reaches.

FIGURE 8 illustrates the manner in which the inner reach of the gathering belt 70 is supported as it moves rearwardly between its drive and idler sprockets, and part of the mechanism for moving the lower portion of the reach toward or away from the center of the picking head P1 to vary the width of the gap 126 (FIG. 6A) to suit the size of the corn being harvested. The latter mechanism also provides a rigid stop for preventing the lower portions of the stop bars from spreading apart, and thus preserves the adjusted width of the gap 126. However, the upper portion of the stop bars can tilt slightly away from the gap. In this manner, the upstanding ears of corn are gripped by the stop bars with some degree of resilience.

The upper attachment tab 116 on the lower chain 114 is provided with an angle clip having an inwardly directed leg 128 arranged to slide along the upper edge 130 of an upright gathering belt support plate 132. The support plate 132 is secured to an elongate L-shaped chain wear plate 134 which has an upright leg that bears against the upper inner edge of the lower chain 114, thus maintaining the adjacent stop bar flights 120 of the inner reach of the gathering belt 70 linear and coplanar. Further, the support and wear plate assembly is pivotally adjustable toward or away from the longitudinal centerline of the picking head P1 so that the interspacing of the forward portions of the confronting reaches of the gathering belts 70 and 72 can be preset for the average size of the corn to be harvested. As illustrated in FIGURE 5 only for the wear plate 134a, each wear plate is pivoted to the wall 56 by a bolt and compression spring 135.

A pivotable lever 136 (FIG. 5) projects laterally through an elongate aperture 138 in the base member 52 for adjusting the inner reach of the gathering belt 70; a similar lever 136a is provided for adjusting the adjacent reach of the gathering belt 72. The lever overlies a slotted locking plate 140, to which it can be locked by a bolt 139 to maintain a selected adjustment. As shown in FIGURES 6A and 6B, the inner end of the lever 136 is secured to a circular retainer disc 142 which is in turn secured coaxially to a circular cam disc 144. The cam disc 144 is rotatable in an aperture provided in the top wall 56 of the base member 54. A bolt 146, threaded into a nut 147 that is welded to the retainer disc, projects through the retainer and cam discs in eccentric relation thereto, and through the base leg of the chain wear plate 134. A compression spring 148 on the bolt 146 maintains gripping tension of the assembled parts with the wall 56. In FIGURE 6A, the positions of the levers 136 and 136a is for maximum separation between the stop bar ledges 124 and 124a, or the position in which the gap 126 is set for arresting the largest diameter ears of corn during a harvesting operation.

The leading ends of the gathering belts 70 and 72 (FIGS. 2, 6A and 7) are provided with conventional gathering chains 150 and 152, respectively. The gathering chain 150 is supported by a cantilever arm 154 that is secured to tabs 156 (FIG. 5) of the frame 52, and extends forward of the gathering chain idler shaft 80. Chain 150 derives its power by means including a sprocket 158 on the idler shaft 80, and is trained around a resiliently mounted idler sprocket 160 (FIG. 6C). Sprocket 160 is rotatably mounted on a bent threaded shaft having one portion 162 slidable in a slot 164 in the cantilever arm 154, and another portion slidable in a guide 166 atop the arm 154. A compression spring 168 urges the sprocket 160 in a direction tensioning the gathering chain 150.

Intermediate the sprockets 158 and 160, the rearwardly moving inner reach of the gathering chain slides over a laterally adjustable guide block 170 which is so positioned on the arm 154 as to keep the inner portion of the chain reach substantially parallel to the centerline of the picking head. The placement of the guide block, and the size and location of the idler sprocket 160 makes the outer portion of the chain reach diagonal relative to the path of the cornstalks between the gathering chains 150 and 152, whereby the two chains provide an outwardly diverging entrance throat for guiding the stalks into the machine. Triangular panels 172 and 172a (FIGS. 2 and 6A) forward of the gathering belts 70, 72 and 70a, 72a, provide smooth walls defining the entrance throat and lie inward of pusher lugs 174, 174a that are mounted on the gathering chains to drive the stalks rearward.

Power is transmitted to the stalk ejector 66 (FIGS. 5, 6 and 7), by a roller chain 176 that is trained around a sprocket 180 on the output shaft 64 of the gear box 62. Chain 176 is trained around a pair of idler sprockets 178, and around a driven sprocket 180. The latter sprocket is mounted on a paddle shaft 182 which extends through spaced upright walls 184, 186 that are secured to the stripper plate 84. Idler sprockets 178 are mounted on an extension 185 of the wall 184.

In its forward end portion, the paddle shaft 182 carries four equiangularly spaced paddle blades 188 which cooperate with similar paddle blades 190, of a stalk ejector 66a for the picking unit P2, that are mounted on a paddle shaft 192. The shafts 182 and 192 carry intermeshing gears 194 so that the paddle blades 188 and 190 rotate in opposite directions. The blades which move toward the center of the picking head travel upward. The stripper plate 84 is provided with a forwardly open central slot 196 that flares outward at its leading end to guide cornstalks between the paddles 188 and 190 if a stalk should break off in the picking unit so that it cannot be harvested in the normal manner. In this event, and as later described in conjunction with FIGURES 9–11, the stalk is gripped by the stalk ejector paddles and driven upwardly out of the machine.

During ejection of the stalk, the ears are arrested by the stripper plate 84 and are thus separated from the stalk. In order to divert the harvested stalks laterally during ejection, a driven deflector paddle 200 (FIGS. 6 and 7) is mounted on a wall 202 that spans the upper portions of the upright walls 184 and 186. The deflector paddle 200 includes a chain and sprocket drive connection 204 to the paddle shaft 192, a shaft 206 rotatable in bearings 208, and four equally spaced paddle blades 210 that are secured to the shaft 206 and lie above the stalk ejector paddles 188 and 190. In cooperation with a sheet metal hood 212 that is open toward the side of the harvesting machine, the deflector paddle 200 forces the broken stalks, fed upward through the stalk ejector 66, laterally onto the ground. It should be noted that the upper portion of the hood 212 has been omitted from FIGURE 6 to show parts it would otherwise conceal.

The normal harvesting of ears from (unbroken) stalks is accomplished by means including conventional counterrotating knife blade rotors 216 and 218 (FIGS. 5 and 7). Lateral journal blocks 220 and 222 rotatably mount a pair of shafts 224 which, forwardly of the block 222, merge into square sections 226. A knife blade 228 is secured to each flat of the square section of each rotor. Above the rotors, the wall 56 of the base member 52 is provided with a forwardly open slot 230 to provide a clearance passage for the cornstalks. It should be noted that the slot 230 is relatively wide so that husks, leaves and other waste foliage have a clear passage into the knife blade rotors for immediate removal from the picking head.

One of the rotor shafts 224 has a drive coupling 232 to the hydraulic motor 58, and the two shafts have intermeshing gears 234 that transfer driving power from the directly driven rotor 218 to the rotor 216. The rotational speed of the rotors is approximately 1200 r.p.m. The knife blades 228 straddle the cornstalk as the harvesting machine 20 is advanced along the row and positively and rapidly drive the stalk downward. Meanwhile, the moving stop bars 120 and 120a above the rotors move rearward slightly faster than the ground speed of the harvesting machine. Consequently, there is very little relative horizontal motion between the ears and the stop bars. When an ear is positioned with its butt-end seated upon the stop bar ledges 124 and 124a, its attachment stem to the stalk is in position to be severed by the rotor knives. Following severing of the harvested ear, it remains supported by the ledges and is carried rearward, gripped by the stop bar assemblies, for discharge along the path E1 (FIG. 3) onto the elevator conveyor 40.

However, because the stem of the severed ear E (FIG. 7) is disposed within the slot 230 in the upper wall 56, the arcuate stop surface 236 (FIG. 5) which defines the end of the slot temporarily arrests the butt end of the ear while the stop bars carry the ear rearward. The net effect of this is that the separated ears incline rearward after they contact the stop surface 236. Consequently, all harvested ears progress beyond the stop surface small-end first.

OPERATION

In FIGURES 9–11, the right side picking head P1 is moving toward a row of cornstalks C1, C2 and C3 in its operative position as controlled by actuation of the cylinders 39 to elevate the picking heads P1 and P2 from the ground line G. Since the angle of declination of the picking heads is adjustable, the operative position might vary under different conditions, but of course the rotors 216 and 218 must be below the lowest ears E. FIGURES 9–11 are substantially vertical sections through the picking head P1, but include the near stalk ejector paddle blades 188 and the near knife blade rotor 216.

The first stalk C1 and its ears E1 and E2 enter the picking unit P1 in the conventional manner as shown for the stalk C2 and ears E3, E4, and stalk C3 and ears E5, E6. If the stalks are tilted, the pusher lugs 174a (or the similar opposed lugs 174) of the gathering chain 152 will bring the lower portion of the stalk into substantial alignment with the rotors 216 and 218. The rotors, revolving at relatively high speed, chop into the stalk and pull it rapidly downward, severing foliage from the stalk and moving the butt or attachment end of the ears toward the stop bar ledges 124a on the moving stop bars 120a. These ledges and stop bars are opposed to similar ledges 124 (FIG. 12) on the opposite reach of stop bars 120. Thus, the ears E1 and E2 are arrested as shown for the ear E in FIGURE 12. The ear is substantially perpendicular to the rotors because, as shown for the stalk C1 (FIG. 9), the upper portion of the stalk tends to lean forward due to the cutting action of the knife blade rotors 216 and 218.

When an ear is seated on the stop bar ledges 124 and 124a (FIG. 12), its attachment at 240 to the stalk C is next severed by the rotors 216 and 218, and the ear is conveyed rearwardly by the confronting reaches of the flights of stop bars 120 and 120a as shown for the ear E2 (FIG. 10). Since the slot 230 (FIG. 12) is wider than the gap formed by the stop bar ledges, all loose foliage falls into the knife blade rotors to be chopped and ejected onto the ground. Meanwhile, the stalk is chopped and pulled downward, and also tends to draw some of the loose foliage through the rotors.

Assuming that the stalk C1 (FIG. 10) either breaks or is severed by the rotors so that a free upper end portion 242, which may have an unharvested ear 244, is left in the machine, the broken stalk portion is carried rearward by the moving stop bars so that the stalk is guided by the stripper plate 84 into the stalk ejector 66. The counterrotating paddle blades 188 and 190 (FIG. 12) thus engage the stalk and force it upward into the blades 210 of the stalk deflector 200 so that the stalk is ejected toward the side of the machine. Meanwhile, the ear 244 is arrested by the stripper plate 84 so that the ear and stalk are separated. The severed ear 244, guided by panels 246, falls back between, and is conveyed rearward, by the moving stop bars.

When the ear E1 (FIG. 10) reaches the end surface of the slot 230, its lower end portion is temporarily retarded by the stop surface 236 (FIG. 12A) so that it tips rearward to travel substantially tassle-end first toward the discharge path E1 onto the level portion of the elevator conveyor 40. All of the normally harvested ears are similarly oriented in this manner. Thus, an important aspect of the operation of the picking heads is that all ears, except the occasional ears harvested from broken stalks, have a uniform orientation which will eventually make it possible to feed the ears into a butt-trimming mechanism mounted on the machine.

The stalk C2 (FIG. 11) is assumed to have broken below the knife blade rotors 216 and 218. However, the normal stalk pulling action continues as long as the stalk does not break above the rotors. Ears E3 and E4 are thus cut from the stalk C2, oriented and conveyed in the same manner already described for ears E1 and E2.

From the preceding description, it will be seen that the moving stop bars 120 and 120a cooperatively form upright moving walls which straddle the cornstalks and resiliently grip both the stalks and the ears as they are processed. Most important, the stop bar ledges 124 and 124a eliminate the usual fixed, slotted stripper plate which is usually used in conventional picking heads to arrest the ears, but which is subject to frequent clogging because its slot must be only wide enough to admit the stalks. In contrast, the functionally comparable gap between the ledges 124 and 124a minimizes the possibility of retaining waste material because the ledges slope downward, and because they are continuously moving. Consequently, waste material immediately drops into the knife blade rotors and is chopped and discharged onto the ground, and the amount of waste conveyed to the elevator conveyor 40 for removal by the blower B is negligible. The stop surface 236 (FIG. 12A) is important in function because the stems of the severed ears slide along the slot 230, and are temporarily retarded by the stop surface until the ears tilt sufficiently to allow the ears to progress in substantially uniform oriented positions.

Having completed a detailed description of the invention so that those skilled in the art could practice the same, I claim:

1. In a mobile corn harvesting machine including a picking head having a frame which carries a rearwardly moving gathering conveyor, snapper means beneath said conveyor for gripping a cornstalk and pulling the stalk downward, and ear abutment means above said snapper means for arresting downward movement of an ear while the attachment of the ear to the stalk is being severed; the improvement wherein said ear abutment means comprises laterally opposed, rearwardly moving butt stops, said butt stops cooperatively defining a straight, elongate slot for longitudinally admitting the cornstalk and leaves, said slot also accommodating downward passage of leaves and severed cornstalks as the ears are removed, and means for moving said butt stops rearward at a horizontal linear speed approximating the ground speed of the harvesting machine so that the ears thus conveyed into the machine have virtually no longitudinal motion relative to said butt stops.

2. Apparatus according to claim 1 wherein said gathering conveyor comprises means projecting upwardly from said butt stops and defining laterally spaced ear supporting walls movable with the butt stops.

3. A picking head for a mobile harvesting machine comprising a frame, a pair of parallel rotors mounted on said frame for cooperatively gripping a growing cornstalk and pulling the stalk and ears downward, an endless gathering belt mounted on said frame above each rotor, each of said belts including a vertically spaced pair of chains rotatable about upright axes spaced longitudinally of the associated rotor, a series of vertically elongate L-shaped stop bars secured to each pair of chains, the confronting flights of said stop bars defining a vertically open passage coincident with a vertical plane intermediate said rotors, each stop bar including a planar upper upright wall portion and an outwardly directed declining lower ledge portion, the confronting edges of said ledge portions cooperatively defining a straight elongate slot for longitudinally admitting the cornstalks, said wall portions of said confronting flights being arranged to laterally support the stalks, and said ledge portions of said confronting flights being arranged to vertically support the ears, the normal upright growing position of the ears on the stalks thus being preserved while the butt ends of the ears are supported on said ledges.

4. In a mobile corn harvesting machine including a picking head having a frame which carries means for gripping a cornstalk near the ground and pulling the stalk downward, and means for arresting downward movement of an ear while the attachment of the ear to the stalk is severed; the improvement comprising moving butt stop means mounted in said picking head above said gripping means, said butt stop means defining an upright wall at each side of a vertical plane including the stalk, each of said walls having a lower butt stop ledge projecting toward the opposite wall, said butt stop ledges cooperatively defining an elongate gap for admitting the cornstalk, and defining shelves arranged to arrest the butt end of the ear, and means for conjointly moving said walls rearward at a linear speed approximating the ground speed of the harvesting machine so that the ear thus conveyed into the machine has virtually no relative horizontal motion with said walls.

5. Apparatus according to claim 4 wherein said butt stops decline from said wall to facilitate the ejection of loose foliage.

6. Apparatus according to claim 4 wherein each of said walls is formed by an endless series of upright, elongate stop bars, and a pair of vertically spaced endless chains connected to said stop bars, said chains being rotatable about horizontally spaced upright axes and having parallel, confronting reaches carrying those stop bars defining said upright walls.

7. Apparatus according to claim 6 and chain adjustment means for each of said walls mounted on said frame, said adjustment means including a wear plate mounted behind the inner surface of the lowermost one of said chains, and means for laterally positioning said wear plate to adjust the interspacing of the confronting reaches of said stop bars and thereby regulate the width of said gap to accommodate different diameter ears.

8. Apparatus according to claim 7 wherein said chain adjustment means includes an elongate support plate adjacent said wear plate, and an attachment clip secured to each of said stop bars in overlying and supported relation with said support plate, those stop bars in each of said confronting walls thereby being coplanar and aligned along their common edges.

9. Apparatus according to claim 8 wherein said stalk gripping means comprises a pair of elongate driven rotors mounted below said stop bars, said rotors being provided with cutting blades which cooperatively cut into a stalk aligned with said vertical plane, said frame including a top wall intermediate said stop bar ledges and said rotors, said wall defining a forwardly open elongate slot for admitting stalks between said ledges and said rotors, the maximum width of said gap as regulated by said chain adjustment means being less than the width of said wall slot, loose waste foliage such as leaves and husks thus gravitating off said declining butt stop ledges to be chopped and ejected downward by said rotors.

10. Apparatus according to claim 9 and a stripper plate mounted above said walls at an elevation below the upper ends of the cornstalks, said plate defining a forwardly open slot aligned with said vertical plane, and a pair of counterrotating stalk ejecting paddles mounted over said stripper plate, said paddles having rotational axes substantially parallel to said rotors and interdigitating blades arranged to grip and drive upward the upper portion of a cornstalk lying in said stripper plate slot, said stripper plate being arranged to arrest any ears carried by said stalk so that relative motion between the ejected stalk and the ears severs the connecting stem of the ears to the stalk.

11. Apparatus according to claim 10 and a stalk deflector mounted over said stalk ejecting paddles, said stalk deflector including a driven rotatable shaft substantially parallel to the axes of said stalk ejecting paddles, and a plurality of radial blades secured to said shaft, said blades sweeping across the upper portions of said stalk ejector paddles to deflect the ejected stalks laterally away from the picking head.

12. Apparatus according to claim 4 and means normally maintaining the ears in upright positions upon said butt stops, a stop lying in the path of the severed attachment stems of the ears being conveyed rearward by said butt stops, said stop means temporarily arresting rearward conveying movement of the butt ends of the ears so that the ears tip rearward and are subsequently conveyed tassle-end first.

13. In a corn harvesting machine a picking head comprising a frame having a forwardly open elongate slot aligned with a row of cornstalks, a pair of rotors mounted in said frame below the slot, said rotors being arranged to cooperatively grip a cornstalk, drive means for rotating said rotors in opposite directions to drive the gripped stalk downward, an endless series of upright stop bars mounted on said frame above each of said rotors, each series of stop bars being rotatable about spaced upright axes and having a reach substantially parallel to and moving rearwardly along the adjacent rotor, and means defining a downwardly and outwardly declining ledge on the lower end of each stop bar, said ledges on the confronting reaches of said stop bars defining an elongate gap narrower than the frame slot for allowing free movement of a cornstalk longitudinally between said rotors, providing moving stop surfaces for arresting downward movement of the harvested ears of corn, and defining a downwardly open path for loose husks, leaves and other waste.

References Cited

UNITED STATES PATENTS

| | | | |
|---|---|---|---|
| 2,480,209 | 8/1949 | Aasland | 56—107 |
| 2,651,163 | 9/1953 | Aasland | 56—107 |
| 2,660,016 | 11/1953 | Richey | 56—104 X |
| 2,716,321 | 8/1955 | Schaaf et al. | 56—104 |
| 3,096,604 | 7/1963 | Baker et al. | 56—18 |
| 3,168,145 | 2/1965 | Gunkel et al. | 171—61 |
| 3,375,646 | 4/1968 | Dion | 56—119 X |

ROBERT PESHOCK, Primary Examiner

ROBERT F. CUTTING, Assistant Examiner

U.S. Cl. X.R.

56—107, 109